Figure 1:
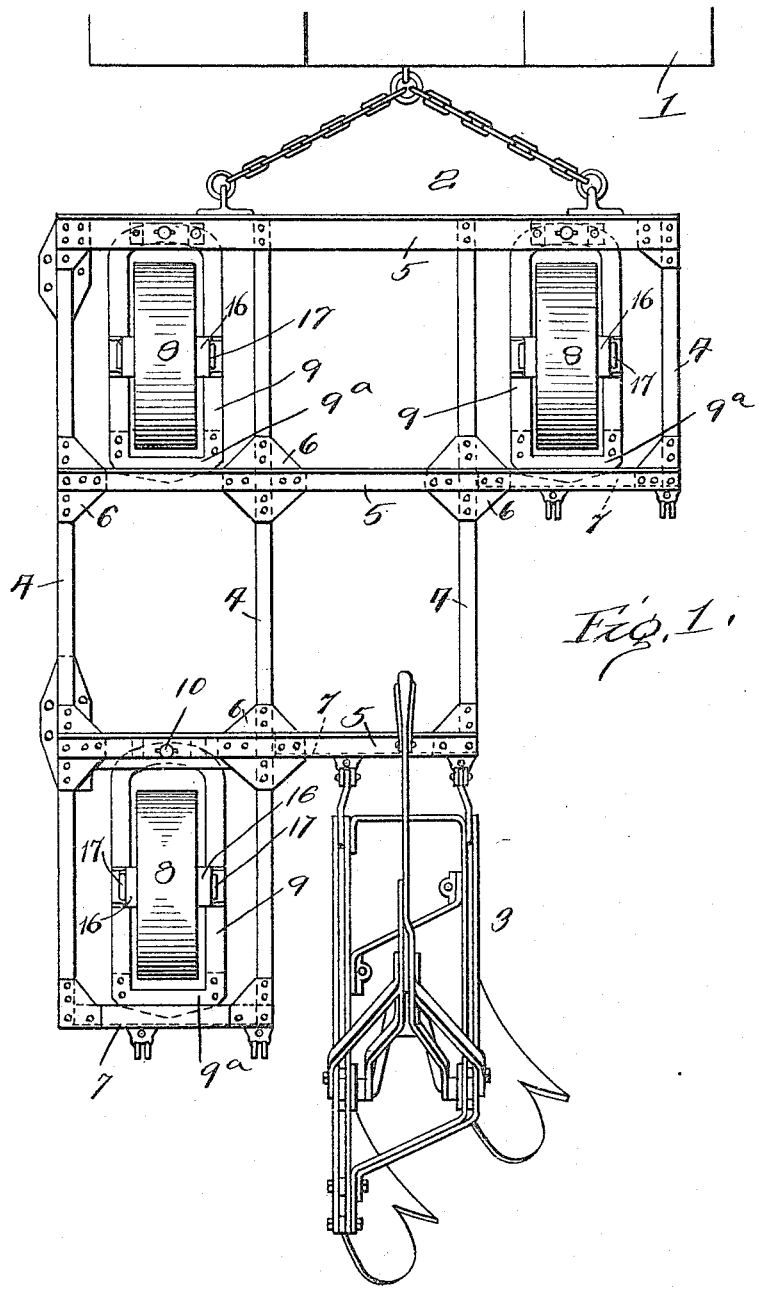

M. SKLOVSKY.
PLOW.
APPLICATION FILED NOV. 27, 1909. RENEWED JUNE 8, 1914.

1,124,344.

Patented Jan. 12, 1915.

3 SHEETS—SHEET 1.

Witnesses
B. Brann
R. S. Gehr

Inventor
Max Sklovsky
By H. H. Bliss
Attorney

M. SKLOVSKY.
PLOW.
APPLICATION FILED NOV. 27, 1909. RENEWED JUNE 8, 1914.
1,124,344.
Patented Jan. 12, 1915.
3 SHEETS—SHEET 2.
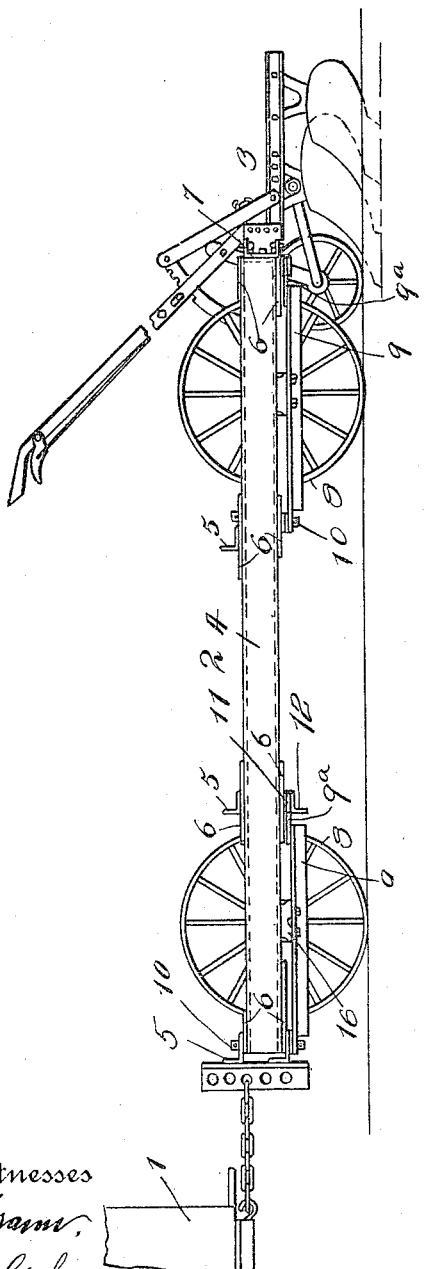
Witnesses
Inventor
Max Sklovsky
By H. H. Bliss
Attorney

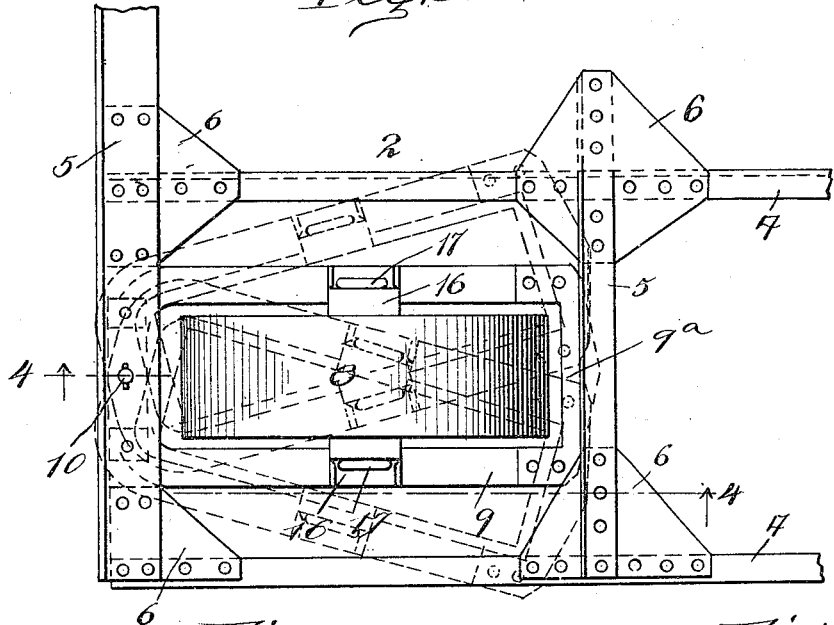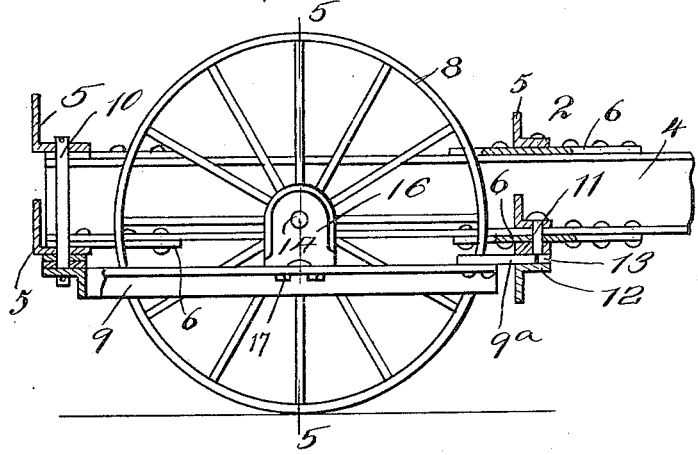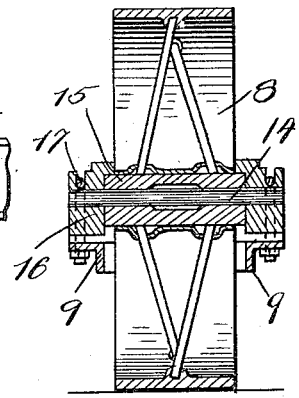

UNITED STATES PATENT OFFICE.

MAX SKLOVSKY, OF MOLINE, ILLINOIS, ASSIGNOR TO DEERE & COMPANY, A CORPORATION OF ILLINOIS.

PLOW.

1,124,344.     Specification of Letters Patent.     Patented Jan. 12, 1915.

Original application filed December 3, 1908, Serial No. 465,875. Divided and this application filed November 27, 1909, Serial No. 530,220. Renewed June 8, 1914. Serial No. 843,908.

*To all whom it may concern:*

Be it known that I, MAX SKLOVSKY, a citizen of the United States, residing at Moline, in the county of Rock Island and State of Illinois, have invented certain new and useful Improvements in Plows, of which the following is a specification, reference being had therein to the accompanying drawing.

This invention relates to steam gang plows of the character shown in my application, Serial No. 465,875, filed December 3, 1908, the present application being a division of the said earlier application.

The objects of this invention are to improve the construction of the main frame and of the supporting wheels therefor.

The character of the invention will be clearly understood from the following description in connection with the accompanying drawing, in which—

Figure 1 is a plan view of a plow frame constructed in accordance with my invention. Fig. 2 is a left side elevation of the plow frame shown in Fig. 1. Fig. 3 is an enlarged plan view of a portion of the main frame and one of the ground wheels. Fig. 4 is a vertical longitudinal section taken on the line 4—4 of Fig. 3, and Fig. 5 is a transverse vertical section on the line 5—5 of Fig. 4.

Referring in detail to the construction shown, 1 indicates in outline the rear platform of a traction engine, 2 indicates the main plow frame as a whole and 3, one of a series of individual plow gangs, such as may be connected to the main frame 2.

As to the individual plow gangs or units flexibly connected to the main frame, it will be understood that the showing in the drawings of one of these units is intended to be merely conventional and not necessarily to accurately represent such a plow unit in all of its details. I do not herein claim as my invention the plow unit, conventionally illustrated as aforesaid, nor the means for supporting it and for connecting it to the main frame. Some of the features of invention incident to the plow unit are fully shown and claimed in my aforesaid co-pending application No. 465,875, and other features are the invention of another and are shown and claimed in an application for patent now pending.

The main frame 2 is preferably built up in the manner shown of structural steel and comprises longitudinal channel bars 4, 4 of varying lengths and transverse angle bars 5, 5, which are rigidly bolted or riveted to the channels. Plates 6 6 are preferably riveted to the channel bars, and the angle bars are in turn riveted to the plates, a very strong rigid construction being thus secured.

It will be noted that the longitudinal and transverse bars of varying lengths are arranged so as to form offsets on the rear side of the frame, and to the transverse bars of these offsets are applied coupling devices to receive the individual plow gangs. To provide suitable supports for the coupling devices, channel bars 7, equal in length to the width of the offsets of the frame, are interposed between the transverse angle irons 5, being riveted to the plates 6. In case of the rearmost transverse bar only the channel 7 is employed, the angle irons being omitted.

The main frame 2 is supported from the ground by a series of wheels 8, preferably three in number, one in each corner of the frame. These wheels are provided with caster mountings, but as they are quite unlike the caster wheels heretofore employed for such purpose, I shall now proceed to describe their construction in detail, referring to but one of the wheels as they are all substantially alike. The wheel is carried by a yoke or frame 9, which is preferably in the form of an angle iron bent into U-shape and connected at its ends by a transverse plate 9$^a$. This yoke is pivoted at its front end to a pin 10 mounted in the transverse bars 5 of the frame, and the transverse bar 9$^a$ of the yoke is disposed between transverse bars 11, 12 secured to the under side of the main frame and suitably spaced apart by blocks 13. The axle 14, on which the hub 15 of the wheel is rotatably mounted, is carried by blocks 16 which are rigidly secured to the sides of the yoke by means of U-shaped clamping bolts 17, which serve both to secure the said blocks in position and to clamp the axle to the blocks.

With the wheel constructed and mounted as described it is clear that the axis upon which the wheel casters is well forward of the wheel axle, so that the drag of the wheel is very strong, and yet the caster bearing is relieved of all twisting stresses by reason of the engagement of the plate 9$^a$ of the yoke with the bearing plate 11 on the under side of the main frame.

As has been stated, a wheel thus constructed and mounted is provided at each corner of the frame, and by reason of the strong drag of these wheels they may be relied upon to swing upon their pivots 10 and take positions adapted to facilitate any and all turning movements of the frame. It will be understood that as the wheel and yoke swing, the yoke bar 9ª slides over the under face of the bearing plate 11 and in all positions is firmly held against upward movement. At the same time the bar or plate 12, which is disposed beneath the rear part of the wheel frame, serves under all circumstances to prevent the latter from falling away from the main frame and subjecting the pivotal connections between the wheel frame and the main frame to injurious strains. The extreme positions taken by the wheel in its swinging movement are indicated by dotted lines in Fig. 3.

The draft frames or platform frames used with steam gang plows, such as herein indicated, being made as aforesaid of wrought structural metal beams are exceedingly heavy and cumbersome as they must transmit and withstand excessive drafts and strains. But, heavy as they are, it is nevertheless necessary that they shall respond as quickly and closely as possible to the changes in direction of travel that are necessitated by the varying movements of the engine. The plows should be caused by the engine and by the frame to follow as accurately as possible lines parallel to the lines of earlier furrows in order to properly turn the earth with uniformly wide furrow slices, and where the furrows vary from straight lines corresponding varying movements of the engine and draft frame are required. And also when turning at the ends of the furrows there must be quick response on the part of the draft frame to the path of the engine, and again, when the latter is moving on lines that will permit the various parts of the apparatus to escape obstructions or impediments. And as the draft frame is, as aforesaid, excessively heavy, it becomes again necessary that it be supported in relatively low horizontal planes, and also that the wheels which are used to support and guide the frame can be large, that is, of relatively long diameter, in order that they may roll easily over the varying surface of the ground. It has been proposed heretofore to support the wheels of these gang plow frames in cast (iron) metal brackets or carriers arranged to caster or swing laterally; but, the carriage or bracket has either been so arranged as to lie in relatively high horizontal planes and connected to the wheel in such way that the axis of the latter is low, the wheel being small or short in diameter; or the carrier has been so arranged as to constitute an ordinary caster iron extending from an elevated front vertical pivot down to and terminating at the axis of the wheel, the front pivot being positioned higher than the wheel; and in this case also the diameter of the wheel has been, and must be, short. Wheel supports of the first kind are typified by that in the patent to Vaniman, 853,046; those of the other class are illustrated by that in the patent to Wedlake, No. 926,306.

I have found it impossible to accomplish my purpose with these earlier devices in supporting and guiding a wrought beam frame of the weight which I find necessary. I arrange the main vertical hinge of the swinging wheel frame in relatively low horizontal planes on a vertical axis well in front of the wheel itself, preferably directly in front of the wheel, so that it intersects the horizontal plane of the wheel axis; and, to prevent excessive strain, I provide at the hinging point a pivot which is preferably elongated and combine with it supporting parts so positioned as to give it a bracing or staying efficiency over a prolonged line, utilizing for this elongated support the flange parts of the bent wrought metal frame or wrought flanged parts attached to the framework.

By bringing the front hinge or pivot of the wheel frame thus relatively low, and to or near the horizontal plane of the wheel axis, a powerful draft can be safely transmitted to the wheel with a greatly reduced danger of the breakage of the pivot or its bearing parts. Then the wheel frame or carrier itself I form of heavy wrought metal bars, and these, too, are positioned in or closely to the horizontal plane of the wheel axis so that the draft from the pivot and its bearing shall be transmitted backward on lines near that plane, and to the greatest advantage. This wheel frame is extended backward to points which are directly behind the wheel and are near the horizontal plane of the wheel axis, where the relations between the wheel frame and the heavy main frame are such that the latter shall bear downward thereon both behind the wheel and in front thereof, the rear bearing points and the front ones being approximately equi-distant from the wheel axis. The heavy wrought metal frame therefore rides along on what may be regarded as a floating saddle, the bearing points being low down near the ground; and although the wheel is one of long diameter it is subjected to greatly reduced torsion leverage, and the tendency to throw the top of the wheel laterally under the stress of the great weight is also reduced.

I am aware that castering wheels, or wheels that swing laterally automatically, broadly considered, have been used in connection with structures of many sorts. But I have designated the laterally swinging wheel and wheel frame herein shown and described, for special combination with the metal traction frames of power gang plows. When the framework is built as shown, with open spaces or cells between the longitudinal bars and the transverse bars, the large wheel referred to can be employed, as the frame permits it to project upwardly above its top horizontal planes, and yet sufficient space in the frame is provided for it to swing laterally. And in this connection it is to be noted that under many circumstances (as in difficult plowing) it is advantageous to have both of the front wheels, 8, arranged and connected in the way I have described so that the said swinging of either will be compensated and assisted by the other. And I believe myself to be the first to have so constructed and related the parts of the main frame and the parts which constitute and attach the wheel frame as to permit these two large wheels to be arranged behind the front end of the main frame so that they can be held in position without requiring any supplemental framework such as has been necessary in the earlier constructions where front castering wheels were placed in front of the draft frame and held by supplemental overhanging frames specially applied, and projecting upward and forward to carry the caster frames of the wheels. By using the front main cross beam of the frame I give to these wheels the strongest position for support available in the apparatus, and by forming the frame with the open spaces or cells behind the front transverse frame bar permit them both to be placed at the front, and at the corners of the frame.

The draft chains which connect the frame to the engine, as will be seen, are so arranged, that, immediately, on the engine changing its line of advance one of the chains draws laterally on the main frame at a point near one of the front swinging wheels, the other chain instantly becoming slack and inactive; and because of this arrangement of draft chains and front swinging wheels, the engine and the main frame have a relationship which is materially different from that which would exist were use made of connecting bars or links secured by pivots to the engine and the frame or if non-castering wheels were used.

What I claim is,

1. In a gang plow mechanism, the combination of the main draft frame held bodily at substantially fixed distances from the ground surface and adapted to be connected to a tractor and to have a series of rearward trailing plow beams hinged thereto, the ground wheel adapted to swing laterally relatively to the draft devices and to the main frame, the swinging frame carrying said wheel pivoted to the main frame at an axis in front of the wheel and extending to points in the rear thereof and adapted to support the main frame at points in front and at points in rear of the wheel, and means carried by the main frame in the rear of the wheel for preventing the rear part of the wheel frame from falling away from the main frame.

2. In a gang plow mechanism, the combination of the main draft frame having its parts held at substantially fixed distances from the ground and adapted to be connected to a tractor and also to have a series of rearward trailing plow beams hinged thereto, a ground wheel adapted to swing relatively both to the draft devices and to the main frame, the swinging frame carrying said wheel extending from points at the rear thereof in horizontal planes relatively near that of the wheel axis to a pivot in front of the wheel, said swinging frame being adapted to support the main frame both at points in front and at points in rear of the wheel, and means carried by the main frame for limiting the downward movement of the wheel frame relatively to the main frame.

3. In a gang plow mechanism, the combination of the main draft frame adapted to be connected to a tractor and to have a series of rearward trailing plow beams hinged thereto, a laterally swinging ground wheel for the frame, a laterally swinging frame for said wheel, the vertical pivot for the said frame situated relatively low near the horizontal plane of the wheel axis and in front of the periphery of the wheel, the holder on the main frame for the pivot with parts positioned relatively low near the said horizontal plane, said wheel frame extending from said pivot backward on lines which are low relatively to the said horizontal plane of the wheel axis and slidably engaging with the under side of a transverse bar on the main frame, said main frame being arranged to rest upon the wheel frame at points in horizontal planes near that of the wheel axis both in the rear of the wheel and in the front thereof, substantially as set forth.

4. In a gang plow mechanism, the combination of the main draft frame adapted to be flexibly connected to an engine, and to have a series of rearward trailing plow beams connected thereto, said frame being constructed with longitudinal bars and transverse bars arranged to provide spaces open vertically, a relatively large laterally swinging ground wheel for said frame arranged in one of the said spaces, and extending upward through and to planes above the frame, a laterally swinging saddle-like frame for said wheel arranged in relatively low horizontal planes near the horizontal plane of the wheel axis, the main frame bearing upon the said saddle-like frame at two points in horizontal planes which are low relatively to the wheel axis, one of the said points being in front of the wheel periphery and the other in the rear thereof and approximately equidistant from the wheel axis, the vertical pivot at the front end of the swinging frame, and the holder for said pivot supported by the main frame, the rear end of the swinging frame having slidable engagement with the under side of a main frame bar, substantially as set forth.

5. In a gang plow mechanism, the combination of the draft frame adapted to have a series of rearward trailing plow beams connected thereto and formed of longitudinal wrought metal beams and transverse wrought metal beams with horizontal flanges, the laterally swinging ground wheel 8, the wheel frame formed of wrought metal bars 9, 9ª, arranged below the wheel axis, the vertical pivot 10 for the wheel frame extending through two of the horizontal flanges of the main frame to provide a prolonged holder for said pivot, the cross bearing bar 11 at the bottom of the main frame and engaging with the bar 9ª of the wheel frame, all constructed and arranged substantially as set forth, whereby the main frame can rest at relatively low points on the wheel frame, and the rear end of the wheel frame can slide laterally under the said bearing bar, substantially as set forth.

6. In a gang plow mechanism, the combination of the main draft frame adapted to be connected to a tractor and to have a series of rearward trailing plow beams hinged thereto and formed of longitudinal wrought metal beams and transverse wrought metal beams arranged to provide open cells surrounded by the outside beams, and one of the transverse beams being located at the front end of the said frame, two relatively large ground wheels of long diameter situated behind the said front transverse frame beam, and two saddle-like laterally swinging frames for the said wheels respectively each formed of longitudinal wrought metal bars positioned relatively low near the horizontal plane of its wheel axis and having a front vertical pivot with a holder at the rear side of the said front cross frame bar, the main frame bearing upon each of said saddle-like swinging frames at two points which are low relatively to the wheel axis, one point being in the rear of the wheel and the other adjacent to the said pivot in front of the wheel, both of the said wheels extending up through the said framework to horizontal planes above it, and one supporting one of the front corners of the main frame and the other supporting the other corner, substantially as set forth.

In testimony whereof I affix my signature, in presence of two witnesses.

MAX SKLOVSKY.

Witnesses:
BEN J. KOUGH,
EUGENE L. TAYLOR.

Copies of this patent may be obtained for five cents each, by addressing the "Commissioner of Patents, Washington, D. C."